US012716340B2

(12) United States Patent
Arkadakskiy et al.

(10) Patent No.: US 12,716,340 B2
(45) Date of Patent: Aug. 25, 2026

(54) METHODS FOR ENHANCING THE PERMEABILITY OF REACTIVE ROCK RESERVOIRS

(71) Applicant: Saudi Arabian Oil Company, Dhahran (SA)

(72) Inventors: Serguey Viktorov Arkadakskiy, Dhahran (SA); Zeyad Tareq Ahmed, Dhahran (SA); Noushad Kunnummal, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/823,960

(22) Filed: Sep. 4, 2024

(65) Prior Publication Data

US 2025/0243740 A1 Jul. 31, 2025

Related U.S. Application Data

(63) Continuation-in-part of application No. 18/422,524, filed on Jan. 25, 2024, now Pat. No. 12,297,730.

(51) Int. Cl.

| | |
|---|---|
| ***E21B 43/27*** | (2006.01) |
| ***C09K 8/74*** | (2006.01) |
| ***E21B 41/00*** | (2006.01) |
| ***E21B 43/16*** | (2006.01) |

(52) U.S. Cl.

CPC ................ *E21B 43/27* (2020.05); *C09K 8/74* (2013.01); *E21B 41/0064* (2013.01); *E21B 43/164* (2013.01)

(58) Field of Classification Search

CPC .... E21B 43/27; E21B 41/0064; E21B 43/164; C09K 8/74

See application file for complete search history.

(56) References Cited

U.S. PATENT DOCUMENTS

| | | | | |
|---|---|---|---|---|
| 4,527,627 | A * | 7/1985 | Graham | E21B 43/267 166/280.2 |
| 4,807,703 | A * | 2/1989 | Jennings, Jr. | E21B 43/27 166/308.5 |
| 5,310,003 | A | 5/1994 | Jennings | |
| 11,155,462 | B2 | 10/2021 | Arkadakskiy et al. | |
| 2020/0317513 | A1* | 10/2020 | Arkadakskiy | C01B 3/56 |
| 2022/0288526 | A1* | 9/2022 | Ahmed | B01D 53/1481 |
| 2023/0038447 | A1 | 2/2023 | Hasan et al. | |
| 2023/0235214 | A1* | 7/2023 | Hasan | E21B 43/164 166/279 |

OTHER PUBLICATIONS

Canziani, "EcoTechnologies for Wastewatr Treatment", The International Water Associates Conference Proceedings, June 23-27, 5 pages, 2014.
Gislason et al., "A brief history of CarbFix: Challenges and victories of the project's pilot phase", Energy Procedia, vol. 146, pp. 103-114, 2018.
Gunnarsson et al., "The rapid and cost-effective capture and subsurface mineral storage of carbon and sulfur at the CarFix2 site", International Journal of Greenhouse Gas Control, vol. 79, pp. 117-126, 2018.
Koide et al., "Carbon microbubbles sequestration: a novel technology for stable underground emplacement of greenhouse gases into wide variety of saline aquifers, fractured rocks and tight reservoirs", Energy Prodedia, vol. 1, pp. 3655-3662, 2009.
Meegoda et al., "Stability of Nanobubbles", Environmental Engineering Science, vol. 00, No. 00, 12 pages, 2018.
Mito et al., "Geochemical trapping of CO2 in saline aquifer storage: Results of repeated formation fluid sampling at the Nagaoka site", Energy Procedia, vol. 37, pp. 5449-5455, 2013.
Snoebjornsdottir et al., "Carbon dioxide storage through mineral carbonation", Nat Rev Earth Environ, vol. 1, pp. 90-102, 2020.
Suzuki et al., "Feasibility Study on CO2 Micro-Bubble Storage (CMS)", Energy Procedia, vol. 37, pp. 6002-6009, 2013.
Wang et al., "Preparation and Properties of CO2 Micro-Nanobubble Water Based on Response Surface Methodology", Applied Sciences, vol. 11, 15 pages, 2021.
Xue et al., "Microbubble carbon dioxide injection for enhanced dissolution in geological sequestrtion and improved oil recovery", Energy Procedia, vol. 63, pp. 7939-7946, 2014.

(Continued)

*Primary Examiner* — Silvana C Runyan

(74) *Attorney, Agent, or Firm* — Dinsmore & Shohl LLP

(57) ABSTRACT

A method of stimulating a geological formation, the method comprising positioning an acidic fracturing fluid consisting essentially of water, dissolved $CO_2$ (carbonic acid), and at least one of $CO_2$ microbubbles or $CO_2$ nanobubbles in the geological formation, wherein the positioning comprises passing the acidic fracturing fluid through an injection well casing to contact reactive rock in the geological formation; hydraulic fracturing the geological formation; acidizing the geological formation with the acidic fracturing fluid to yield a geological formation with increased permeability; and performing one or more of the following applications in the geological formation with increased permeability: geothermal energy harvesting, hydrogen production, hydrocarbon production, water/brine production, economic element extraction, waste disposal, as well as any other extraction, injection, or disposal operations of economic interest.

14 Claims, 2 Drawing Sheets

(56) References Cited

OTHER PUBLICATIONS

Zhou et al., "Long-Term Stability of Different Kinds of Gas Nanobubbles in Deionized and Salt Water", Materials, vol. 14, No. 1808, 20 pages, 2021.
Abrams, et al., "Higher-pH Acid Stimulation Systems", Society of Petroleum Engineers of AIME, Journal of Petroleum Technology, pp. 2175-2184, Dec. 1983.
Gysi et al., "CO2-water-basalt interaction. Numberical simulation of low temperature CO2 sequestration into basalts", Geochimica et Cosmochima Acta, vol. 75, pp. 4728-4751, 2011.
Metcalf et al., "Aecitic Acid Demonstrates Greater Carbonate Dissolution Thank Typically Expected", Canadian International Petroleum Conference, 9 pages, Jun. 8-10, 2004.
Middleton et al., "CO2 as a fracturing fluid: Potential for commercial-scale shale gas production and CO2 sequestration", Energy Procedia, vol. 63, pp. 7780-7784, 2014.
Oelkers et al., "Mineral Carbonation of CO2", Elements, vol. 4, pp. 333-337, Oct. 2008.
Wiese et al., "CO2 fixation by calcite in high—temperature geothermal systems in Iceland", ÍSOR-2008/003, 2008.
Suleimenova, et al., "Comparative Study of Acid Fracturing and Propped Hydraulic Fracturing for a Tight Carbonate Formation", Society of Petroleum Engineers, SPE Europec, 78th EAGE Conference and Exhibition, SPE-180114-MS, May 30-Jun. 2, 2016.
Flores et al., "Stimulation of Geothermal Wells, Can We Afford It?", Proceedings World Geothermal Congress 2005, pp. 24-29, Apr. 2005.
Lu et al., "Thermally induced fracturing in hot dry rock environments—Laboratory studies", Geothermics, vol. 106, 102569, pp. 1-10, 2022.
Qureshi et al., "CO2 hydrate stability in oceanic sediments under brine conditions", Energy, vol. 256, 124625, pp. 1-13, 2022.
Watanabe et al., "A numerical study on the creation of artificial supercritical geothermal reservoirs by hydraulic fracturing", Geothermics, vol. 105, 102500, pp. 1-17, 2022.
Office Action pertaining to U.S. Appl. No. 18/422,524 dated Sep. 12, 2024, 22 pages.

* cited by examiner

METHODS FOR ENHANCING THE PERMEABILITY OF REACTIVE ROCK RESERVOIRS

CROSS-REFERENCE TO RELATED APPLICATIONS

This application is a continuation-in-part of U.S. Pat. No. 12,297,730 filed Jan. 25, 2024, titled "Methods of Stimulating Geological Formations with Acidic Fracturing Fluids", the entire disclosure of which is incorporated herein by reference.

FIELD

Embodiments disclosed herein generally relate to methods of stimulating geological formations, and more specifically, to methods of enhancing the permeability of reactive geological formations targeted for geothermal energy production, hydrogen production, hydrocarbon production, water/brine production, economic element extraction, or waste disposal as well as any other extraction or injection/disposal operations of economic interest to and from subsurface reactive geological formations

TECHNICAL BACKGROUND

Rock permeability is crucial for the economical extraction of natural resources and energy from geological formations and for the disposal of wastes into the subsurface. This includes the extraction of geothermal energy, hydrocarbons, hydrogen, and water/brine, as well as the mining of dissolved constituents of economic value such as calcium, potassium, uranium, lithium, bromine, rare earth elements (REE), etc. It also encompasses the sequestration of $CO_2$ and other water soluble waste gases such as $H_2S$, as well as the disposal of wastewater/brine, and solid/slurry wastes, including hazardous materials such as naturally occurring radioactive materials (NORM). While many of these activities target sedimentary rock reservoirs, others, like geothermal energy production and in-situ $CO_2$ mineralization, are largely confined to igneous rock reservoirs, which make up a substantial part of the Earth's crust. Igneous (and metamorphic) rocks rich in calcium, magnesium, and iron minerals react with acidic solutions, leading to the formation of secondary minerals such as silicates and carbonates. In-situ mineral carbonation of $CO_2$, for example, uses these reactions to trap injected $CO_2$ permanently in solid carbonate form, hence these rocks are referred to as reactive rocks. Examples of reactive rocks include calcium, magnesium and iron-rich igneous rocks such as basalt, andesite, gabbro and peridotite, metamorphic rocks such as amphibolite, melanocratic gneiss and eclogite, as well as clastic and volcaniclastic sedimentary rocks like breccia, conglomerate, sandstone, shale, tuff, and scoria that contain minerals or rock fragments of the aforementioned igneous and metamorphic rocks. Certain chemical sedimentary rocks such as banded iron formations (BIF) and their metamorphosed analogues, which consist mostly of iron-rich minerals are also considered reactive. Reactive sedimentary and volcanic igneous rocks, such as sandstone and basalt, may possess both primary (matrix) and fracture permeability, whereas reactive igneous plutonic rocks and metamorphic rocks such as gabbro, ultramafic rocks, gneiss, and amphibolite, along with some altered volcanic and volcanoclastic rocks or cemented clastic sediments, often lack significant primary permeability. Consequently, production from or injection into subsurface formations comprised of such rocks is only feasible if they have adequate secondary permeability, which can be naturally occurring (due to tectonic fracturing and faulting) or enhanced through well stimulation methods like hydraulic fracturing, thermal fracturing, and acidification. Furthermore, there is a need for a novel method of stimulating geological formations comprising reactive rocks that does not involve the use of strong acids and, that does not excessively produce insoluble, nonreactive phases that may occlude permeability.

SUMMARY

Permeability of geological formations is essential for the economic recovery of geothermal energy and resources (i.e., petroleum, hydrogen, water/brine, metals/elements, etc.) as well as to disposing of wastes such as $CO_2$, water, brine, solids, etc. into such formations. While many of these activities target sedimentary rock reservoirs, others, are largely confined to igneous rock reservoirs. Igneous (and metamorphic) rocks rich in calcium, magnesium, and iron minerals react with acidic solutions, leading to the formation of secondary minerals such as silicates and carbonates. Examples include volcanic, and plutonic igneous rocks such as basalt, andesite, gabbro, anorthosite, pyroxenite, peridotite, etc., metamorphic rocks such as schist, gneiss, amphibolite, eclogite, etc. Other examples of reactive rocks include sedimentary rocks such as conglomerate, sandstone, etc. that consist entirely or in part of rock fragments or minerals of the reactive igneous (and metamorphic) rocks as well as certain chemical sedimentary rocks such as banded iron formations (BIF), which consist predominantly of iron-bearing minerals. Reactive volcanic and clastic sedimentary rocks may possess both primary (matrix) and secondary (fracture) permeability. Crystalline reactive rocks such as gabbro, ultramafics, metamorphic rocks and BIF etc. as well as altered volcanic and volcaniclastic rocks or fully cemented clastic sedimentary rocks that consist entirely or in part of reactive rock fragments and minerals however, may lack substantial primary (matrix) permeability. Therefore, injection into and/or the production of fluids from geological formations comprising these rock types may require sufficient secondary permeability. Secondary permeability could be natural (e.g., fracturing and faulting developed as a result of tectonic processes), or could be augmented by well stimulation activities such as hydraulic fracturing, thermal fracturing, acidification, or combinations thereof (e.g. acid fracturing). Conventional acidizing treatments generally include strong acids to increase a permeability of a geological formation by dissolving acid soluble minerals. However, acidification of a reactive formation with strong acids, may also produce insoluble (non-reactive) crystalline and/or amorphous mineral phases that may reduce the permeability of the geological formation, among other disadvantages, such as the production of free-phase gaseous $CO_2$ (should the formation contain carbonate minerals), which may further damage formation permeability, as well as by causing increased corrosion of the wellbore and equipment. To avoid the issues associated with using strong acids, and in particular the excessive production of insoluble, nonreactive phases in the geological formation, embodiments disclosed herein may include methods of stimulating a geological formation. The methods may include a combination of hydraulic fracturing (with or without thermal fracturing); acidification of reactive geological formations targeted for geothermal energy production, hydrogen production, hydrocarbon production, water/brine production, economic element/metal extraction, the disposal of aqueous and solid wastes (e.g. slurry such as NORM); or combinations thereof, by treating the reactive geological formation with an acidic fluid that includes dissolved $CO_2$ or other weak acids, is enriched with $CO_2$ micro/nanobubbles, or combinations thereof.

According to one or more embodiments of the present disclosure, a method of stimulating a reactive geological formation may include: positioning an acidic fracturing fluid comprising dissolved $CO_2$, and/or other weak acids, and $CO_2$ microbubbles and/or $CO_2$ nanobubbles in the geological formation; hydraulic fracturing the geological formation; and acidizing the geological formation with the acidic fracturing fluid, thereby increasing a permeability of the geological formation, and wherein the method may be used for the purposes of geothermal energy production, hydrogen production, hydrocarbon production, water/brine production, economic element extraction, or waste disposal as well as any other extraction or injection/disposal operations of economic interest to and from subsurface reactive geological formations.

According to one or more embodiments, a method of stimulating a reactive geological formation may include: positioning an acidic fracturing fluid comprising dissolved $CO_2$ and $CO_2$ microbubbles and/or $CO_2$ nanobubbles in the geological formation; hydraulic (and/or thermal) fracturing the geological formation; acidizing the geological formation with the acidic fracturing fluid, thereby increasing a permeability of the geological formation; and sequestering $CO_2$ by reacting the $CO_2$ in the acidic fracturing fluid with reactive rock in the geological formation to form carbonates.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing summary and the following detailed description are merely exemplary, and are intended to provide an overview or framework to understand the nature and character of the claims. The drawings are included to provide a further understanding of the embodiments and, together with the detailed description, serve to explain the principles and operations of the claimed subject matter. However, the embodiments depicted in the drawings are illustrative and exemplary in nature, and not intended to limit the claimed subject matter.

When describing the simplified schematic illustration of FIG. 2, the numerous valves, temperature sensors, compressors, electronic controllers, pumps and the like, which may be used and are well known to a person of ordinary skill in the art, are not included. Further, accompanying components that are often included in systems such as those depicted in FIG. 2, such as wellbore casing, wellbore stabilizers, hydraulic fracturing equipment, acidizing equipment, and the like are also not included. However, a person of ordinary skill in the art understands that these components are within the scope of the present disclosure.

Additionally, the arrows in the simplified schematic illustration of FIG. 2 refer to process streams. However, the arrows may equivalently refer to transfer lines, which may transfer process steams between two or more system components. Arrows that connect to one or more system components signify inlets or outlets in the given system components and arrows that connect to only one system component signify a system outlet stream that exits the depicted system or a system inlet stream that enters the depicted system. The arrow direction generally corresponds with the major direction of movement of the process stream or the process stream contained within the physical transfer line signified by the arrow.

The arrows in the simplified schematic illustration of FIG. 2 may also refer to process steps of transporting a process stream from one system component to another system component. For example, an arrow from a first system component pointing to a second system component may signify "passing" a process stream from the first system component to the second system component, which may comprise the process stream "exiting" or being "removed" from the first system component and "introducing" the process stream to the second system component.

BRIEF DESCRIPTION OF DRAWINGS

While the specification concludes with claims particularly pointing out and distinctly claiming the subject matter of the description, it is believed that the description will be better understood from the following specification when taken in conjunction with the accompanying drawings, wherein:

Figure 2:
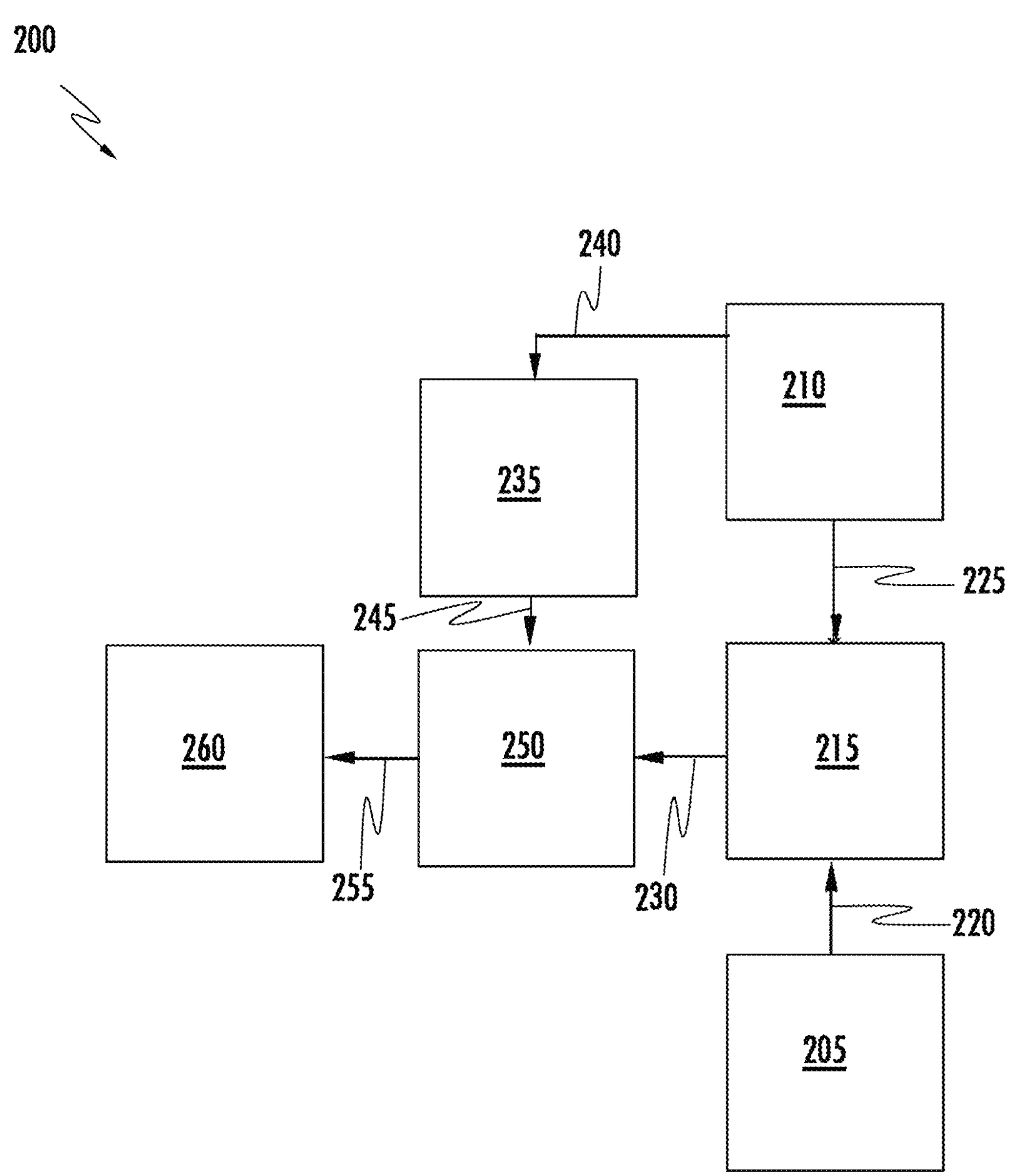
FIG. 2 schematically depicts a system for stimulating a geological formation and sequestering $CO_2$ in the geological formation, according to one or more embodiments of the present disclosure.

The system of FIG. 2 may be used for stimulating a geological formation targeted for geothermal energy harvesting, hydrogen production, hydrocarbon production, economic element extraction, water/brine production, and waste disposal, according to one or more embodiments of the present disclosure.

DETAILED DESCRIPTION

Reference will now be made in detail to embodiments of the present application, various embodiments of which will be described herein with specific reference to the accompanying drawings. Whenever possible, the same reference numerals will be used throughout the drawings to refer to the same or like parts. The present disclosure is directed to methods of stimulating a geological formation comprising hydraulically fracturing and acidizing a geological formation. Such methods may be useful for extracting geothermal energy, producing hydrogen, hydrocarbons, water, and/or brine; extracting from that water/brine elements of economic interest including but not limited to calcium, potassium, lithium, bromine, uranium, radium, trace and rare earth metals and elements, etc.; and disposing of wastewater, liquid waste, solid (slurry) waste, which may include naturally occurring radioactive materials (NORM), and for the injection of fluids for the purpose of maintaining pressure in reactive subsurface formations. Further, such methods may be useful for increasing a production rate of water from a water production well, which may for example improve methods for sequestering $CO_2$ and/or other soluble waste gases due to the demand of high volumes of carrier water for dissolving and transporting those waste gases into the subsurface, as well as for relieving pressure inside the geological formation (reservoir) caused by injection. Embodiments of the present disclosure may include a method comprising positioning an acidic fracturing fluid comprising dissolved $CO_2$ and $CO_2$ microbubbles and/or $CO_2$ nanobubbles in the geological formation, hydraulic fracturing the geological formation, acidizing the geological formation with the acidic fracturing fluid, thereby increasing a permeability of the geological formation, and sequestering $CO_2$ by reacting the $CO_2$ in the acidic fracturing fluid with reactive rock in the geological formation to form carbonates.

In the following detailed description, numerous specific details may be set forth in order to provide a thorough understanding of embodiments described herein. However, it will be clear to one skilled in the art when embodiments may be practiced without some or all of these specific details. In other instances, well-known features or processes may not be described in detail so as not to unnecessarily obscure the disclosure. In addition, like or identical reference numerals may be used to identify common or similar elements. Moreover, unless otherwise defined, all technical and scientific terms used herein have the same meaning as commonly understood by one of ordinary skill in the art to which this disclosure belongs. In case of conflict, the present specification, including the definitions herein, will control the meaning of said technical and scientific terms.

As used throughout this disclosure, the term "wellbore" refers to a bored well capable of receiving the acidic fracturing fluid. The wellbore can be placed horizontally, vertically, or positioned at any angle within the section of the geological formation that is targeted for stimulation and sequestration. The wellbore creates a path capable of permitting both fluids and apparatuses to traverse between the surface and the subsurface geological formation. In addition to defining the void of volume comprising the wellbore, the wellbore wall acts as the interface through which the acidic fracturing fluid other fluids can traverse between the wellbore and the geological formation. Furthermore, the design and setup of the wellbore can be dependent upon the specific properties of the system, including but not limited to, the characteristics of the geological formation, the depth of an injection/production zone in the geological formation, and the specific properties of the acidic fracturing fluid.

As used throughout this disclosure, the term "geological formation" refers to a body of rock that is sufficiently distinctive and continuous that it can be mapped, and can include a rock formation, a rock reservoir, a reactive rock reservoir, water containing formation, or deep aquifer, among others. As used herein, the terms "reactive geological formation", "reactive rock formation", or "reactive rock reservoir" refers to a body of rock comprising at least one of a reactive rock. As used herein, a "reactive rock" comprises, either entirely or in part of, certain mineral and amorphous phases capable of chemically reacting with acidic solutions to produce stable secondary compounds. Reactive rocks may be rich in divalent cations including calcium, magnesium, and iron, and when subjected to natural and engineered processes such as hydrothermal alteration or the injection of dissolved $CO_2$ for sequestration, these reactive species produce secondary minerals including but not limited to carbonates and silicates. These secondary minerals may occlude porosity and reduce permeability in reactive geological formations, effectively reducing well productivity and injectivity, which negatively affects the economic performance of wells. To improve permeability, well stimulation methods such as hydraulic and/or thermal fracturing with the use of acids is often employed, since by dissolving carbonates and, to a lesser extent, other mineral or amorphous phases adding acid can augment the impact of the hydraulic and/or thermal fracturing of the rock.

Examples of reactive rocks may comprise rocks that consist of common rock-forming minerals rich in Ca, Mg and Fe including but not limited to pyroxene, feldspar, olivine, hornblende, iron oxides, etc. Further examples of reactive rocks may include igneous volcanic, subvolcanic, and plutonic rocks, which based on their chemical compositions and $SiO_2$ content, are further classified as ultramafic, mafic, and intermediate rocks, respectively. The term "mafic", as used herein, may generally describe a silicate mineral or igneous rock that is rich in magnesium and iron but poor in silicon. Mafic minerals can be dark in color, and examples of rock-forming mafic minerals include amphibole and biotite. Examples of mafic rocks include basalt, diabase, and gabbro. Examples of ultramafic rocks include dunnite, peridotite, and pyroxenite. Examples of intermediate rocks may comprise diorite, andesite, monzonite, anorthosite, etc. Other examples of reactive rocks may include Ca, Mg and Fe-rich metamorphic rocks such as mafic to intermediate schist, melanocratic gneiss, amphibolite, eclogite, metamorphosed ultramafic rocks and certain contact metamorphic rocks such as skarn. Other examples of reactive rocks include clastic or volcaniclastic sedimentary rocks such as tuff, shale, sandstone, conglomerate, etc. comprised entirely or in part of the minerals and/or fragments of the reactive igneous and/or metamorphic rocks listed above as well as certain chemical sedimentary rocks such as banded iron formations and their metamorphosed analogues, which comprise mostly of iron oxides, carbonates and silicates. In some embodiments, the mafic rock comprises basaltic rock.

As described in U.S. Pat. No. 12,297,730, a weak inorganic acid such as carbonic acid may be used in reactive rocks, since the inorganic acid would dissolve pore-occluding carbonate while also minimizing the formation of insoluble secondary phases. A geological formation comprising entirely or in part of intermediate, mafic or ultramafic rock minerals and fragments can allow components of an injected stream to react in-situ with the rock components to precipitate and store components of the injected stream in the formation. The geological formation may comprise in part or entirely of mineral and amorphous (e.g. volcanic glass) phases capable of chemically reacting with the injected stream to produce stable secondary compounds including but not limited to carbonates.

As used throughout this disclosure, the term "casing" refers to a portion of the wellbore wherein fluids cannot penetrate the wellbore walls to reach the formation. The casing may include a metallic or non-metallic pipe inside the wellbore. The casing may be centralized within the wellbore. The space between the casing and the wellbore walls may be filled with materials, such as but not limited to cement to ensure well stability and/or zonal insulation. The casing can be disposed within at least a portion of the wellbore.

As used throughout this disclosure, the term "formation conduit" refers to a channel that fluidly connects the wellbore with the surrounding geological formation. A formation conduit can be in fluid communication with the reactive rock and be configured to allow fluids, such as the acidic fracturing fluid, to be delivered to the reactive rock. The formation conduit can include an unlined portion of the wellbore wherein fluids can penetrate into the geological formation.

As used throughout this disclosure, the term "gaseous" refers to the state of matter with the properties and characteristics of a gas and does not refer to the supercritical state of matter.

As used throughout this disclosure, the term "microbubble" refers to a bubble ranging from about 1 micrometer to 10 micrometers in diameter. The small size of these microbubbles gives them unique physical and chemical properties, including but not limited to, increased surface area of up to 600 times of larger (macro) bubbles produced by conventional diffusers, decreased buoyancy, decreased velocity of motion, and increased resistance to bursting/collapse at higher pressures. Furthermore, the term "nanobubble" as used throughout this disclosure refers to bubbles with a diameter of less than 200 nanometers that exhibit properties including but not limited to, increased reactivity and stability due to their high specific surface area, high stagnation time, which may enhance the mass transfer efficiency and reactions at the gas-liquid interface, and decreased coalescence due to repulsive forces generated by electric charges at the gas-liquid interface.

As used throughout this disclosure, the term "hydraulic fracturing" or "hydraulically fracturing" refers to a stimulation treatment performed on geological formations where fracturing fluids are pumped into a geological formation at an elevated pressure such that fractures form within the geological formation.

As used throughout this disclosure, the term "thermal fracturing" or "thermally fracturing" refers to a stimulation treatment performed on geological formations where fluids, including water, are pumped into a geological formation at temperatures below the temperature of the geological formation such that fractures form within the geological formation as a result of the cooling of the reservoir rock as water reaches the near wellbore area.

As used throughout this disclosure, the term "stimulating", or "enhancing" refers to increasing the permeability of geological formations by fracturing a geological formation.

As used throughout this disclosure, the term "acidizing" refers to the treatment of a subterranean formation with a stimulation fluid containing a reactive acid. The acidizing can improve the formation permeability to increase an injectivity of the geological formation.

As used throughout this disclosure, the term "carbonate" refers to rocks or fragments thereof that comprise 95% or more by weight carbonate minerals such as calcite ($CaCO_3$), aragonite (also $CaCO_3$), dolomite ($CaMg(CO_3)_2$), siderite ($FeCO_3$), ankerite (($Ca(Fe,Mg,Mn) (CO_3)_2$), etc. Carbonate, as referred throughout this disclosure could be the product of secondary processes such as alteration, weathering, or replacement of geological formations that comprise entirely or in part of reactive rocks, minerals or fragments thereof.

As used in the present disclosure, the term "substantially free" of a component means less than 1 wt. % of that component in a particular portion of a composition. For example, a dissolved $CO_2$ solution, which may be substantially free of free-phase CO, may comprise less than 1 wt. % of free-phase $CO_2$.

Figure 1:
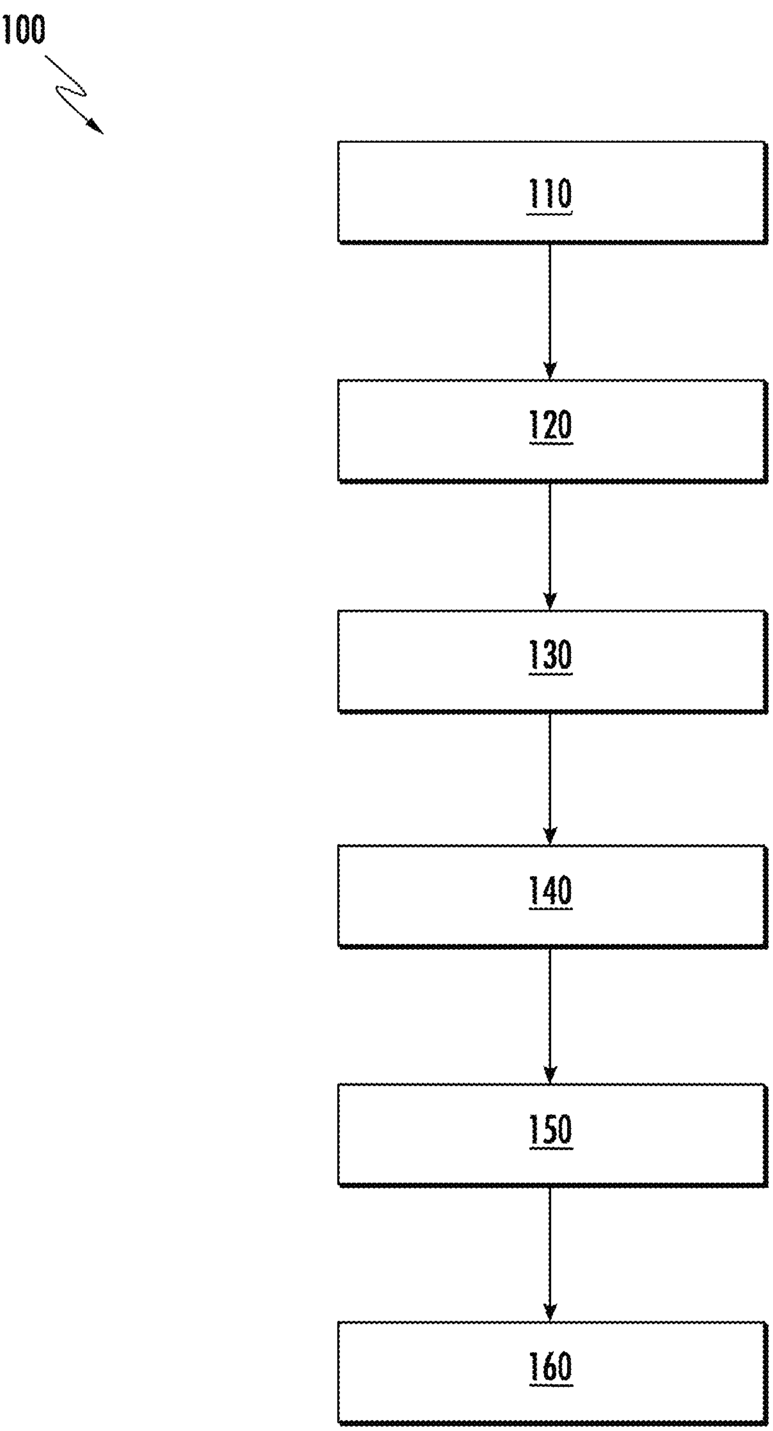
FIG. 1 depicts a flowchart of a method for enhancing the permeability of reactive rock reservoirs, according to embodiments disclosed herein.

Referring now to FIG. 1, a method 100 of stimulating a geological formation and sequestering $CO_2$ in the geological formation is depicted. The method 100 may comprise positioning an acidic fracturing fluid comprising dissolved $CO_2$ and $CO_2$ microbubbles and/or $CO_2$ nanobubbles in the geological formation, at step 110, hydraulic fracturing the geological formation, at step 120, acidizing the geological formation with the acidic fracturing fluid, thereby increasing a permeability of the geological formation, at step 130, and sequestering $CO_2$ by reacting the $CO_2$ in the acidic fracturing fluid with reactive rock in the geological formation to form carbonates, at step 140.

As shown in the method 100 of FIG. 1, the method may comprise positioning the acidic fracturing fluid comprising dissolved $CO_2$ and $CO_2$ microbubbles and/or $CO_2$ nanobubbles in the geological formation, at step 110. In embodiments, the acidic fracturing fluid may be passed through an injection well casing within a wellbore to contact the reactive rock in the geological formation. The injection well casing may be disposed within the wellbore, extending downhole a depth within the wellbore, wherein a passage within the injection well casing may be in fluid communication with reactive rock of the geological formation.

In embodiments, the acidic fracturing fluid may be formed by combining a solution comprising dissolved $CO_2$ with microbubbles and/or nanobubbles of $CO_2$. In embodiments, the acidic fracturing fluid may be formed by dissolving gaseous $CO_2$ in an aqueous solution to form a dissolved $CO_2$ solution, and injecting $CO_2$ via microbubbles and/or nanobubbles into the dissolved $CO_2$ solution. In embodiments, the dissolved $CO_2$ solution may be a saturated $CO_2$ solution. In embodiments, the dissolved $CO_2$ solution may be an unsaturated $CO_2$ solution. In embodiments, the dissolved $CO_2$ solution may be substantially free of free-phase $CO_2$.

In other embodiments, the acidic fracturing fluid may be formed by combining a weak organic acid with a solution comprising dissolved $CO_2$ with microbubbles and/or nanobubbles of $CO_2$. In embodiments, the acidic fracturing fluid may be formed by dissolving gaseous $CO_2$ in aqueous fluid that contains another weak organic acid to form a dissolved $CO_2$ solution having increased acid loading, and injecting $CO_2$ via microbubbles and/or nanobubbles into the dissolved $CO_2$ solution. In embodiments, the weak organic acid may comprise at least one of formic acid, acetic acid, citric acid, lactic acid, or sulfate-bearing acids including sulfamic acid. In other embodiments, the acidic fracturing fluid may be formed by adding at least one of a weak acid to a pre-made solution comprising dissolved $CO_2$ with microbubbles and/or nanobubbles of $CO_2$.

In further embodiments, the acidic fracturing fluid may be chilled to a temperature of at least 12° C. before the geological formation is acidized. In embodiments, the acidic fracturing fluid may be chilled to a temperature of at least 15° C., at least 20° C., at least 30° C., at least 40° C., or even at least 50° C. In specific embodiments, when the geological formation comprises a temperature of less than 100° C., the acidic fracturing fluid may not comprise sulfamic acid.

The aqueous solution may be one or more of deionized, tap, distilled, or fresh waters; natural, brackish, or saturated salt waters; marine waters, natural formation waters including but not limited to hydrocarbon formation produced waters, or synthetic brines; filtered or untreated seawaters; mineral waters; treated or untreated wastewater; or other potable or non-potable waters containing one or more dissolved salts, minerals, or organic materials. In embodiments, the aqueous solution may comprise at least 80 wt. %, at least 90 wt. %, at least 95 wt. %, at least 99 wt. %, at least 99.9 wt. % or even 100 wt. % of water. The aqueous solution may be sourced with certain specific properties including but not limited to temperature and salinity of the aqueous solution, which may impact the solubility of $CO_2$ and/or the design, material and operation of the microbubble/nanobubble generator.

In embodiments, the $CO_2$ microbubbles and/or $CO_2$ nanobubbles may be gaseous $CO_2$ microbubbles and/or gaseous $CO_2$ nanobubbles. In embodiments, the $CO_2$ microbubbles and/or $CO_2$ nanobubbles may be supercritical $CO_2$ microbubbles and/or supercritical $CO_2$ nanobubbles. Without intending to be bound by any particular theory, it is believed that the injection of microbubbles and/or nanobubbles of $CO_2$ into the dissolved $CO_2$ solution may produce a supersaturated $CO_2$ solution, which may have a concentration of $CO_2$ greater than a saturated dissolved $CO_2$ solution, thereby increasing an amount of $CO_2$ that may be sequestered within the geological formation. Further, it is believed that the addition of supercritical $CO_2$ microbubbles and/or supercritical $CO_2$ nanobubbles in the acidic fracturing fluid compared to gaseous $CO_2$ microbubbles and/or gaseous $CO_2$ nanobubbles alone, may result in a greater amount of $CO_2$ in the acidic fracturing fluid, thereby increasing the acid-generating capacity of the fracturing fluid, which may increase a penetration depth of the acidic fracturing fluid into the geological formation. This increased penetration depth of the acidic fracturing fluid may enhance the efficacy of the acidification, which may increase the amount of $CO_2$ that can be delivered and sequestered in the geological formation.

The methods described herein may produce an acidic fracturing fluid comprising greater than or equal to 5 weight percent (wt. %) and less than or equal to 35 wt. % $CO_2$, based on the total weight of the acidic fracturing fluid. For instance, the acidic fracturing fluid may comprise from 5 wt. % to 35 wt. %, from 6 wt. % to 30 wt. %, from 7 wt. % to 25 wt. %, from 8 wt. % to 20 wt. %, from 9 wt. % to 15 wt. % $CO_2$, or any and all ranges and sub-ranges between the foregoing values, based on the total weight of the acidic fracturing fluid. Without intending to be bound by any particular theory, it is beloved that if an amount of $CO_2$ is added to the acidic fracturing fluid beyond the saturation limit of the acidic fracturing fluid, the $CO_2$ may form a free phase gas and/or exsolve when a pressure in the geological formation dissipates, which may decrease the permeability of the geological formation.

In embodiments, the acidic fracturing fluid may comprise, consist essentially of, or consist of water, at least one of a weak organic acid, carbonic acid, and $CO_2$. In embodiments, at least 80 wt. %, at least 85 wt. %, at least 90 wt. %, at least 95 wt. %, at least 99 wt. %, at least 99.9 wt. %, or even 100 wt. % of the acidic fracturing fluid may include water, at least one of a weak organic acid, carbonic acid, and $CO_2$.

As shown in the method 100 of FIG. 1, the method may comprise hydraulic fracturing the geological formation, at step 120. In embodiments, the hydraulic fracturing may comprise injecting the acidic fracturing fluid in the geological formation at a pressure above the geological formation fracturing pressure. A wellbore of the geological formation may be considered as the primary path in which the acidic fracturing fluid flows into the geological formation. The acidic fracturing fluid may be introduced into the wellbore at high pressures and flow rates. The pressure and flow rate will vary depending on the type and properties of the geological formation. Regardless, the acidic fracturing fluid may be introduced into the wellbore at a pressure and flow rate such that the pressure created inside the target geological formation is greater than the fracturing pressure of geological so as to propagate fractures, generate fractures, or both. As used in the present disclosure, the term "fracturing pressure" refers to a pressure greater than which the injection of fluids will cause the geological formation to fracture hydraulically.

In embodiments, the acidic fracturing fluid may be injected at a pressure above the geological formation fracturing pressure, thereby hydraulically fracturing the geological formation. The hydraulic fracturing may increase a permeability of the geological formation, thereby increasing a volume of the acidic fracture fluid that may be injected into the wellbore, increasing a volume of the acidic fracture fluid that may reach the reactive rock in the geological formation, or both. The increased volume of the acidic fracturing fluid that may be injected into the wellbore and/or reach the reactive rock in the formation may increase an amount of $CO_2$ that may be sequestered within the geological formation.

In embodiments, the acidic fracturing fluid may be injected at a temperature below the geological formation fracturing temperature, thereby thermally fracturing the geological formation. The thermal fracturing may increase a permeability of the geological formation, thereby increasing a volume of the acidic fracture fluid that may be injected into the wellbore, increasing a volume of the acidic fracture fluid that may reach the reactive rock in the geological formation, or both. The increased volume of the acidic fracturing fluid that may be injected into the wellbore and/or reach the reactive rock in the formation may increase an amount of $CO_2$ that may be sequestered within the geological formation. Furthermore, it is known that thermal fracturing can improve the heat extraction performance of enhanced geothermal systems (EGSs).

In embodiments, the hydraulic fracturing may include first injecting the acidic fracturing fluid at a pressure below the geological formation fracturing pressure, and then injecting the acidic fracturing fluid at a pressure above the geological formation fracturing pressure. In embodiments, a first portion of the acidic fracturing fluid may be injected into the geological formation at a pressure below the geological formation fracturing pressure, and a second portion of the acidic fracturing fluid may be injected into the geological formation at a pressure above the geological formation fracturing pressure.

As shown in the method 100 of FIG. 1, the method may comprise acidizing the geological formation with the acidic fracturing fluid, thereby increasing a permeability of the geological formation, at step 130. In embodiments, the acidizing may comprise treating the geological formation with the dissolved $CO_2$ in the acidic fracturing fluid. The dissolved $CO_2$ (carbonic acid) may be operable to dissolve at least a portion of geological formation, thereby increasing a permeability of the geological formation, and/or increasing an injectivity of the geological formation. In embodiments, the acidizing may produce wormholes, conductive fractures, or combinations thereof in the geological formation.

In embodiments, the acidizing may be carried out during the hydraulic fracturing or following the hydraulic fracturing.

In embodiments, the acidic fracturing fluid may not comprise a strong acid. In embodiments, the acidic fracturing fluid may not comprise an organic acid. In embodiments, the acidic fracturing fluid may not comprise a strong acid or an organic acid.

In embodiments, the acidizing may not comprise treating the geological formation with a strong acid. In embodiments, the acidizing may not comprise treating the geological formation with an organic acid. In embodiments, the acidizing may not comprise treating the geological formation with a strong acid, an organic acid, or combinations thereof.

In embodiments, the acidizing may comprise treating the geological formation with an acid, wherein the acid consists of mineral acids. In embodiments, the acidizing may comprise treating the geological formation with an acid, wherein the acid consists of carbonic acid.

In embodiments, the acidizing may comprise treating the geological formation with an acid, wherein the acid comprises a weak acid selected from the group comprising formic acid, acetic acid, citric acid, lactic acid, sulfamic acid, or a combination thereof.

In embodiments, the acidizing may comprise treating the geological formation with an acid, wherein the acid consists of carbonic acid.

In embodiments, the acidizing may comprise treating the geological formation with an acid, wherein at least 80 wt. %, at least 85 wt. %, at least 90 wt. %, at least 95 wt. %, at least 99 wt. %, or 100 wt. % of the acid is carbonic acid present in the acidic fracturing fluid prior to positioning the acidic fracturing fluid in the geological formation, based on the total weight of the acid. In some embodiments, the entirety of the acid in the acidic fracturing fluid may be provided through the dissolution of $CO_2$ in the acidic fracturing fluid.

Without intending to be bound by any particular theory, it is believed that conventional acidizing methods that use strong acids may produce water insoluble minerals, which may damage the geological formation, reduce the injectivity of the geological formation, or both. Dissolution of reactive rocks such as basalt and/or other igneous, metamorphic and/or sedimentary rocks with strong acids, which have fast reaction kinetics, may result in the formation of significant quantities of insoluble secondary phases such as amorphous silica, clays (e.g., smectite, kaolinite), and/or Al—Fe oxy-hydroxides. Furthermore, it is believed that the strong proton consuming (base) response of the basalts and other reactive rocks upon dissolution may rapidly raise the pH of the ambient solution away from the wellbore, which may lead to supersaturation and the eventual precipitation of other water insoluble mineral phases, such as clays and zeolites. Further, many of these secondary minerals are nonreactive with acids and in particular with weak acids, such as carbonic acid. Therefore, by replacing the original reactive rock minerals with nonreactive minerals and by filling the reactive matrix porosity and/or larger open spaces such as vesicles and fractures, the dissolution of basalt and other reactive rocks with strong acids may have a significant negative impact not only on the reactivity but also on the permeability of the geological formation.

In embodiments, the use of dissolved $CO_2$ (carbonic acid) instead of conventional strong acids, may produce acid-soluble carbonates, which may continue to be dissolved and redeposited further in the geological formation during subsequent injections of the acidic fracturing fluid, and/or the continuous injection of $CO_2$-loaded aqueous fluids, thereby increasing an amount of $CO_2$ that may be sequestered within the geological formation.

Without intending to be bound by any particular theory, it is believed that the use of conventional strong acids for acidizing a geological formation, wherein the geological formation may already include calcite and/or other carbonate minerals, may produce free phase gaseous $CO_2$. The production of free phase gaseous $CO_2$ may result in the formation of $CO_2$ gas filled domains at irreducible water saturation, which could temporarily or permanently reduce permeability by preventing aqueous fluid flow (injectivity) by capillary forces. The formation of free gas phase domains may also slow down reactive rock dissolution since it may only proceed in an aqueous milieu.

Without intending to be bound by any particular theory, it is believed that the use of the methods as disclosed herein can enhance the permeability of geological formations targeted for geothermal energy extraction, hydrogen production, hydrocarbon production, water/brine production, economic element extraction, and waste disposal.

In embodiments, the use of dissolved $CO_2$ (carbonic acid) instead of conventional strong acids, may reduce an amount of free phase gaseous $CO_2$ produced during the acidizing with strong acids, thereby maintaining or increasing the permeability of the geological formation. Further, the exclusion of strong acids in the acidizing fluid may reduce a rate of corrosion of the wellbore or operational equipment compared to conventional acidizing that includes strong acids, thereby reducing the operational cost of methods and systems described herein.

In embodiments, the inclusion of $CO_2$ microbubbles and/or $CO_2$ nanobubbles in the acidic fracturing fluid during the acidizing may increase the permeability and/or injectivity of the geological formation compared to methods that do not include $CO_2$ microbubbles and/or $CO_2$ nanobubbles in the acidic fracturing fluid during the acidizing. Without intending to be bound by any particular theory, it is believed that the small physical size of the $CO_2$ microbubbles and/or $CO_2$ nanobubbles would allow the $CO_2$ to be carried further and deeper into fine micron-sized fractures and or into porous matrix spaces, where upon their eventual collapse the microbubbles and/or nanobubbles will provide $CO_2$ needed to acidify the ambient fluid and enhance the dissolution of the reactive minerals and rocks. Further, it is believed that the relative stability and neutral to negative buoyancy of the $CO_2$ microbubbles and/or $CO_2$ nanobubbles may reduce or preclude potential buoyancy-driven flow issues as well as the coalescence and formation of $CO_2$ single phase accumulations in the geological formation.

As shown in the method 100 of FIG. 1, the method may comprise sequestering $CO_2$ by reacting the $CO_2$ in the acidic fracturing fluid with reactive rock in the geological formation to form carbonates, at step 140.

In embodiments, the $CO_2$ in the acidic fracturing fluid may react with reactive rock in the geological formation, thereby forming stable carbonates within the geological formation. The mineralization of $CO_2$ with the geological formation may sequester the $CO_2$ within the geological formation. In embodiments, the acidic fracturing fluid may enter the wellbore of the geological formation and reach reactive rock in the geological formation via a formation conduit. In embodiments, the hydraulic fracturing and the acidizing steps of the methods disclosed herein may increase a concentration of $CO_2$ that may be sequestered within the geological formation.

In embodiments, the geological formation may comprise a reactive rock that comprises entirely or in part of a reactive mineral and/or amorphous phases. In embodiments, the reactive rock of the geological formation may comprise reactive mineral and/or amorphous phases comprising intermediate, mafic or ultramafic igneous and metamorphic rocks, as well as certain chemical sedimentary rocks such as banded iron formations (BIF). In embodiments, the reactive rock of the geological formation may comprise entirely or in part of reactive minerals and/or amorphous phases comprising igneous, metamorphic and sedimentary rocks, or combinations thereof.

In embodiments, the formed carbonates may be soluble in carbonic acid, therefore multiple injections of the acidic fracturing fluid comprising the dissolved $CO_2$ and $CO_2$ microbubbles, and/or $CO_2$ nanobubbles in the geological formation may continue to dissolving and redepositing these carbonates further into the geological formation, thereby increasing near-wellbore permeability and injectivity and hence the amount of $CO_2$ that may be sequestered within the geological formation.

In embodiments, the method may include treating an injection site of the geological formation comprising a water injection well. The treatment of the water injection well may increase a rate at which $CO_2$-rich water may be injected into the water injection well.

In embodiments, the method may include treating a production site of the geological formation that includes a water production well. The treatment of the water production well may increase a rate of water production from the water production well. In such embodiments, the water produced from the water production well may be used for $CO_2$ dissolution to form a dissolved gas solution, and the dissolved gas solution may be subsequently injected into the water injection well.

Now referring to FIG. 2, an example system 200 that may be suitable for use with the methods and/or apparatuses described herein is schematically depicted. The system 200 may include an aqueous solution source 205, a gaseous $CO_2$ source 210, and a vessel 215 operable to receive an aqueous solution 220 from the aqueous solution source 205 and gaseous $CO_2$ 225 from the gaseous $CO_2$ source 210. The vessel 215 may be configured to dissolve the gaseous $CO_2$ 225 in the aqueous solution 220, thereby forming a dissolved $CO_2$ solution 230. The system 200 may also include a microbubble/nanobubble generator 235 configured to receive gaseous $CO_2$ 240 from the gaseous $CO_2$ source 210, or from a separate $CO_2$ source (not shown), such as a supercritical $CO_2$ source. The microbubble/nanobubble generator 235 may produce $CO_2$ microbubbles and/or $CO_2$ nanobubbles 245. The system 200 may also include a fracturing fluid tank 250 operable to receive the dissolved $CO_2$ solution 230 and the $CO_2$ microbubbles and/or $CO_2$ nanobubbles 245, thereby forming an acidic fracturing fluid 255. The acidic fracturing fluid 255 may be injected into a wellbore 260 within a geological formation. In embodiments, the fracturing fluid tank 250 may be pressurized at a desired pressure based upon use, such as at a pressure above the fracturing pressure of the geological formation for hydraulically fracturing the geological formation. In embodiments, the system 200 may include one or more pressurized tanks operable to receive the acidic fracturing fluid 255 from the fracturing fluid tank 250 (not shown), where a pressure of each of the pressurized tanks is independently maintained, such as a first pressurized tank at relatively high pressure for hydraulically fracturing the geological formation and a second pressurized tank at a reduced pressure relative to the first fracturing fluid tank for acidizing the geological formation.

The methods described herein may limit the formation of secondary water insoluble crystalline and/or amorphous phases that can damage the reservoir injectivity and reactivity by promoting the formation of acid soluble carbonate minerals such as calcite, which may re-dissolve and re-precipitate further into the geological formation, thus facilitating the sequestration of $CO_2$ and trapping of waste products in the geological formation. Examples of waste products may include but are not limited to liquid waste, solid waste, slurry waste, which may or may not include naturally occurring radioactive materials (NORM). Without being bound by theory, and for at least these reasons above, the methods described herein are also believed to facilitate the extraction of geothermal energy (i.e., geothermal energy harvesting), hydrogen production, hydrocarbon production, water/brine production, economic element extraction, and waste disposal. The specific combination of hydraulic fracturing and acidizing using the acidic fracturing fluid, as described herein may provide increased permeability (injectivity and productivity) of the geological formation, thereby increasing the efficiency at which geothermal energy, hydrogen, hydrocarbons and elements may be extracted or produced from a geological formation. Further, the unique properties of the $CO_2$ microbubbles and/or $CO_2$ nanobubbles in the acidic fracturing fluid may increase the total mass of $CO_2$ into the acid fracturing fluid, thereby producing a stable supersaturated $H_2O$—$CO_2$ solution. Further, the small size, low buoyancy and relative stability of the $CO_2$ microbubbles and/or the $CO_2$ nanobubbles may allow the $CO_2$ microbubbles and/or $CO_2$ nanobubbles to penetrate further into microfractures within the geological formation, thereby extending the impact zone of the acid fracturing stimulation further into the geological formation.

A first aspect of the present disclosure is directed to a method of stimulating a geological formation, the method comprising positioning an acidic fracturing fluid comprising dissolved $CO_2$ and $CO_2$ microbubbles and/or $CO_2$ nanobubbles in the geological formation; hydraulic fracturing the geological formation; acidizing the geological formation with the acidic fracturing fluid, thereby increasing a permeability of the geological formation; and wherein the method may be applied for the purposes of geothermal energy harvesting, hydrogen production, hydrocarbon production, water/brine production, economic element extraction, waste disposal, or a combination thereof, as well as any other extraction, injection, or disposal operations of economic interest.

A second aspect of the present disclosure may include the first aspect, wherein the positioning comprises passing the acidic fracturing fluid through an injection well casing to contact the reactive rock in the geological formation.

A third aspect of the present disclosure may include the first or second aspect, wherein the dissolved $CO_2$ solution is substantially free of free-phase $CO_2$.

A fourth aspect of the present disclosure may include the first through third aspects, wherein the acidic fracturing fluid comprises greater than or equal to 5 weight percent $CO_2$, based on the total weight of the acidic fracturing fluid.

A fifth aspect of the present disclosure may include any one of the first through fourth aspects, wherein the $CO_2$ in acidic fracturing fluid comprises less than or equal to 35 weight percent supercritical $CO_2$, based on the total weight of $CO_2$ in the acidic fracturing fluid.

A sixth aspect of the present disclosure may include any one of the first through fifth aspects, wherein the acidic fracturing fluid consists essentially of water, carbonic acid, and $CO_2$.

A seventh aspect of the present disclosure may include any one of the first through sixth aspects, wherein the hydraulic fracturing comprises injecting the acidic fracturing fluid in the geological formation at a pressure above the geological formation fracturing pressure.

An eighth aspect of the present disclosure may include any one of the first through seventh aspects, wherein a first portion of the acidic fracturing fluid is injected into the geological formation at a pressure below the geological formation fracturing pressure, and a second portion of the acidic fracturing fluid is injected into the geological formation at a pressure above the geological formation fracturing pressure.

A ninth aspect of the present disclosure may include any one of the first through eighth aspects, wherein the acidizing comprises treating the geological formation with the dissolved $CO_2$ in the acidic fracturing fluid.

A tenth aspect of the present disclosure may include any one of the first through ninth aspects, wherein the acidizing does not comprise treating the geological formation with a strong acid.

An eleventh aspect of the present disclosure may include any one of the first through tenth aspects, wherein the acidic fracturing fluid does not comprise a strong acid.

A twelfth aspect of the present disclosure may include any one of the first through eleventh aspects, wherein the geological formation comprises a water injection well, and the method comprises increasing a rate of injection of $CO_2$-rich water into the water injection well.

A thirteenth aspect of the present disclosure may include any one of the first through twelfth aspects, wherein the geological formation comprises a water production well, and the method comprises increasing a rate of water production from the water production well.

A fourteenth aspect of the present disclosure may include any one of the first through thirteenth aspects, wherein the reactive rock comprises igneous ultramafic, mafic to intermediate rock, high grade mafic to intermediate metamorphic rock, clastic sedimentary rock that consists entirely or partially of minerals and fragments (lithic clasts) of the igneous and metamorphic rocks listed, certain chemical sedimentary rocks such as banded iron formations or combinations thereof.

A fifteenth aspect of the present disclosure may include any one of the first through fourteenth aspects, wherein the method further comprises thermal fracturing, and wherein the geological formation is targeted for extraction of geothermal energy.

A sixteenth aspect of the present disclosure may include any one of the first through fifteenth aspects, wherein the acidic fracturing fluid is chilled to a temperature of at least 12° C. before the geological formation is acidized.

A seventeenth aspect of the present disclosure may include any one of the first through sixteenth aspects, wherein the method further comprises injecting, or, hydraulic fracturing the geological formation with a chilled aqueous fluid before the acidic fracturing fluid is positioned, and wherein the chilled aqueous fluid does not comprise $CO_2$, thereby conditioning the well by forming secondary fractures before positioning the acidic fracturing fluid.

An eighteenth aspect of the present disclosure may include any one of the first through seventeenth aspects, wherein the geological formation is acidized or hydraulically fractured with a chilled aqueous solution, and wherein the chilled aqueous solution comprises at least one weak acid, thereby conditioning the well by forming fractures.

A nineteenth aspect of the present disclosure may include any one of the first through eighteenth aspects, wherein the acidic fracturing fluid further comprises at least one weak organic acid comprising formic acid, acetic acid, citric acid, lactic acid, sulfamic acid, or a combination thereof.

A twentieth aspect of the present disclosure may include any one of the first through nineteenth aspects, wherein the acidic fracturing fluid does not comprise sulfamic acid when the geological formation is less than 100° C.

It will be apparent to persons of ordinary skill in the art that various modifications and variations can be made without departing from the scope disclosed herein. Since modifications, combinations, sub-combinations, and variations of the disclosed embodiments, which incorporate the spirit and substance disclosed herein, may occur to persons of ordinary skill in the art, the scope disclosed herein should be construed to include everything within the scope of the appended claims and their equivalents.

For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" or "consists essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

As used in the Specification and appended Claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced.

It should be understood that any two quantitative values assigned to a property may constitute a range of that property, and all combinations of ranges formed from all stated quantitative values of a given property are contemplated in this disclosure. The subject matter disclosed herein has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

What is claimed is:

1. A method of stimulating a geological formation, the method comprising:

positioning an acidic fracturing fluid consisting essentially of water, dissolved $CO_2$, $CO_2$ microbubbles, and $CO_2$ nanobubbles in the geological formation, wherein the positioning comprises passing the acidic fracturing fluid through an injection well casing to contact reactive rock in the geological formation, and wherein the reactive rock comprises igneous ultramafic, mafic to intermediate rock, high grade mafic to intermediate metamorphic rock, clastic sedimentary rock that consists entirely or partially of minerals and fragments of the igneous and metamorphic rocks listed, chemical sedimentary rocks as banded iron formations, or combinations thereof;

hydraulic fracturing the geological formation;

acidizing the geological formation with the acidic fracturing fluid to yield a geological formation with increased permeability; and performing one or more of the following applications in the geological formation with increased permeability: disposal operations of economic interest.

2. The method of claim 1, further comprising sequestering $CO_2$ by reacting the $CO_2$ in the acidic fracturing fluid with reactive rock in the geological formation to form carbonates.

3. The method of claim 1, wherein the dissolved $CO_2$ solution is substantially free of free-phase $CO_2$.

4. The method of claim 1, wherein the acidic fracturing fluid comprises greater than or equal to 5 weight percent $CO_2$, based on the total weight of the acidic fracturing fluid.

5. The method of claim 1, wherein the $CO_2$ in acidic fracturing fluid comprises less than or equal to 35 weight percent supercritical $CO_2$, based on the total weight of $CO_2$ in the acidic fracturing fluid.

6. The method of claim 1, wherein the hydraulic fracturing comprises injecting the acidic fracturing fluid in the geological formation at a pressure above the geological formation fracturing pressure.

7. The method of claim 1, wherein a first portion of the acidic fracturing fluid is injected into the geological formation at a pressure below the geological formation fracturing pressure, and a second portion of the acidic fracturing fluid is injected into the geological formation at a pressure above the geological formation fracturing pressure.

8. The method of claim 1, wherein the acidic fracturing fluid is chilled to a temperature of at least 12° C. to 50° C. before the geological formation is acidized.

9. The method of claim 1, further comprising injecting, or, hydraulic fracturing the geological formation with a chilled aqueous fluid before the acidic fracturing fluid is positioned, and wherein the chilled aqueous fluid does not comprise $CO_2$, thereby conditioning the well by forming secondary fractures before positioning the acidic fracturing fluid.

10. The method of claim 1, wherein the geological formation is acidized or hydraulically fractured with a chilled aqueous solution, wherein the chilled aqueous solution is chilled to a temperature of at least 12° C. to 50° C., and wherein the chilled aqueous solution comprises at least one weak acid, thereby conditioning the well by forming fractures.

11. The method of claim 1, wherein the acidic fracturing fluid further comprises at least one weak organic acid comprising formic acid, acetic acid, citric acid, lactic acid, sulfamic acid, or a combination thereof.

12. The method of claim 1, wherein the acidic fracturing fluid does not comprise sulfamic acid when the geological formation is less than 100° C.

13. The method of claim 1, wherein the reactive rock comprises calcium, magnesium, and iron-rich igneous rocks.

14. The method of claim 1, wherein the reactive rock comprises mafic or ultramafic igneous rocks, where $CO_2$ and other waste gases are permanently immobilized as precipitated carbonate minerals.

* * * * *